Oct. 25, 1955 H. V. NEHER 2,721,957
MICROWAVE OSCILLATOR ELECTRON DISCHARGE DEVICE
Filed Dec. 11, 1945 2 Sheets-Sheet 1
FIG. 1
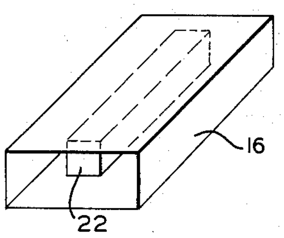
FIG. 4
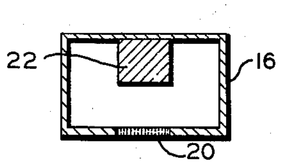
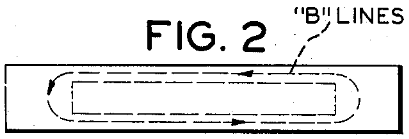
FIG. 5
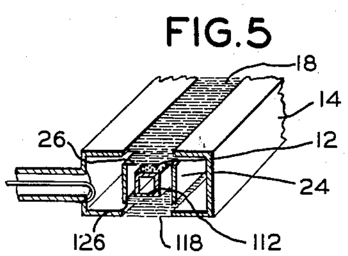
FIG. 3
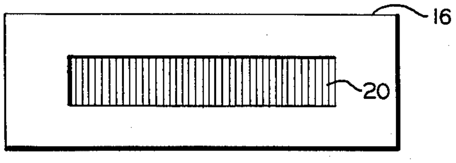
FIG. 6
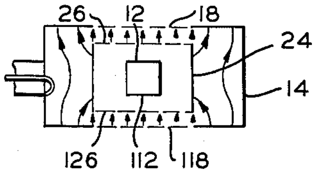
FIG. 7
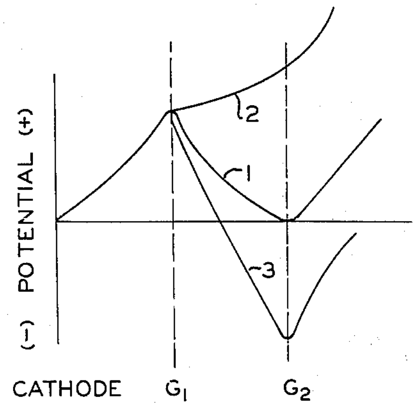
FIG. 8
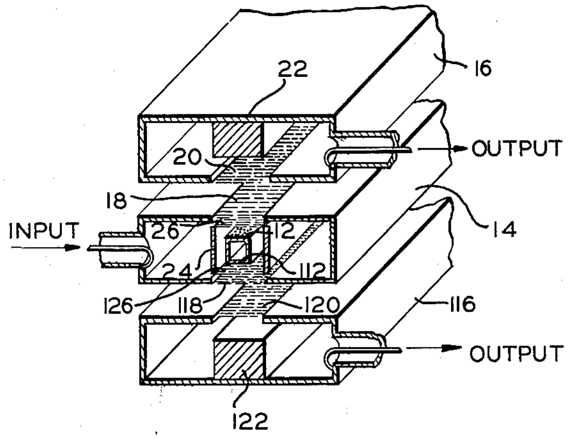
INVENTOR
HENRY V. NEHER
BY M. D. Hayes
ATTORNEY Oct. 25, 1955 H. V. NEHER 2,721,957

MICROWAVE OSCILLATOR ELECTRON DISCHARGE DEVICE

Filed Dec. 11, 1945 2 Sheets-Sheet 2

INVENTOR
HENRY V. NEHER

BY M. O. Hayes

ATTORNEY

United States Patent Office 2,721,957

Patented Oct. 25, 1955

2,721,957

MICROWAVE OSCILLATOR ELECTRON DISCHARGE DEVICE

Henry V. Neher, Pasadena, Calif., assignor, by mesne assignments, to the United States of America as represented by the Secretary of the Navy Application December 11, 1945, Serial No. 634,296

19 Claims. (Cl. 315—40)

This invention relates to microwave oscillators, intended for use either as an amplifier or as a self-excited power source.

The two main types of microwave oscillators heretofore available are the klystron and the magnetron. The maximum electronic efficiency of the klystron is limited by the unavoidable passing of electrons through the output cavity resonator in the wrong phase, "cavity resonator," incidentally, being hereinafter referred to simply as a "cavity." If the tube is being designed for power purposes, effects of space charge become important in spreading the beam both longitudinally and transversely in the drift region, causing debunching so that part of the beam arrives in the wrong phase at the output gap. Another limitation to the power handling capabilities of a klystron should be pointed out. The inherently low mutual electronic conductance between input and output limits the area of surface that can be used for a given wave length, and thus also limits rather drastically the power that can be put into the beam. The magnetron has proved better, but also has limitations. If the magnetron is made too long, the tube may not like to oscillate in the proper mode when it is loaded; there is difficulty in extracting the energy, and multiple couplings may have to be used; and the magnet becomes large. One must have a pulser that will deliver a nearly constant voltage during the time of the pulse, which is not easy when the power reaches two megawatts or more.

For C. W. operation the magnetron, if properly designed, will deliver considerable power, but due to the nonlinear voltage-current characteristic, the voltage must be kept quite constant. Also, there is no satisfactory method of amplitude modulating the magnetron. Moreover, it cannot be used as an amplifier.

The primary object of the present invention is to overcome the foregoing difficulties and limitations of the klystron and magnetron, and to provide an improved microwave oscillator.

A more particular object is to provide an oscillator which may be amplitude modulated with little or no accompanying frequency modulation.

Still another object is to provide an oscillator which may be operated in pulses without requiring a substantially perfect square pulse for controlling the oscillator. An ancillary object is to provide an oscillator in which a control pulse may be applied to a grid instead of an anode, so that the power requirements for the control pulse will be less stringent.

Still another object of the invention is to provide an oscillator using cavities not subject to mode jumping. Another object is to provide an oscillator in which the cavities and the cathode are of the linear type so that the power may be increased by increasing the length of the cavities and cathode.

Still another object is to provide an oscillator having a relatively simple symmetrical structure requiring no high precision machine work, and in which the cavities may be tuned.

To accomplish the foregoing objects, and other more specific objects which will hereinafter appear, my invention resides in the microwave oscillator elements, and their relation one to another, as are more particularly described in the following specification. The specification is accompanied by drawings in which:

Fig. 1 is an isometric view of an anode cavity;

Fig. 2 is explanatory thereof;

Fig. 3 is a bottom view thereof;

Fig. 4 is a section therethrough;

Fig. 5 is an isometric view of an input cavity and cathode;

Fig. 6 is explanatory of the operation of the input cavity;

Fig. 7 is a graph showing the potentials on some of the electrodes of the oscillator;

Fig. 8 is an isometric view showing an assembly of an input cavity and two output cavities;

Figure 9:
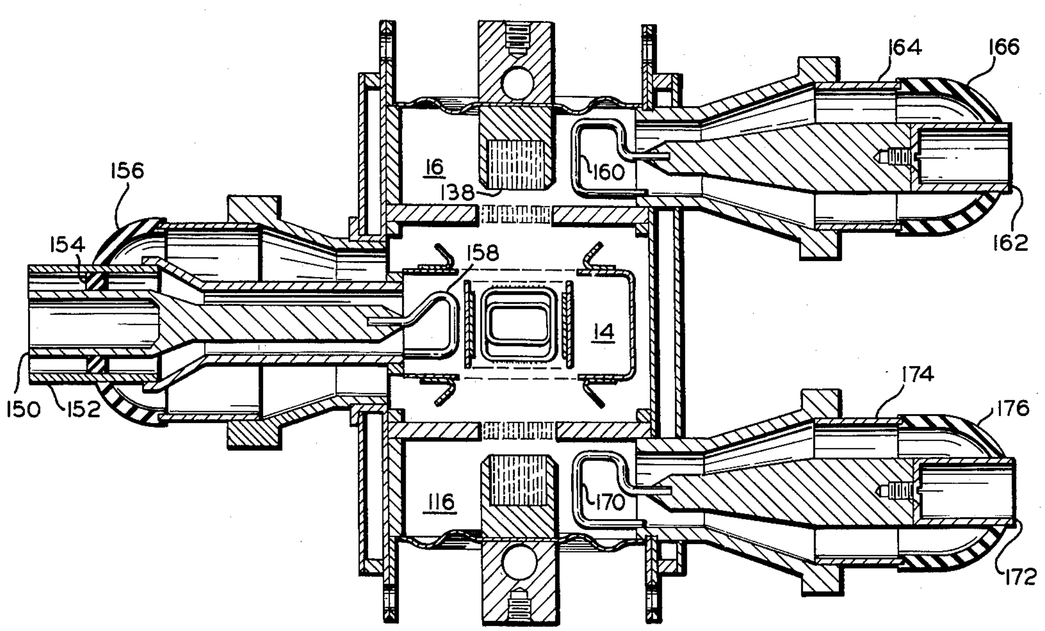
Fig. 9 is a cross-section through an oscillator embodying features of my invention, said section being taken at the input and output couplings to the cavity.

In the present invention I provide what may for convenience be termed a "space-charge control tube," which at long wave lengths would correspond to the usual negative grid tube. However, inasmuch as at the frequencies here involved, namely 3000 to 10,000 megacycles, a grid operated with a negative potential to reduce loading as is done at longer wave lengths, would fail its purpose completely, the term "space-charge-control" is preferred.

Referring to the drawing, and more particularly to Fig. 8, the space-charge-control tube comprises a cathode surface 12 disposed within an input cavity 14. The input cavity is what may be called a "linear cavity," and the cathode area and the output power of the tube may be increased by increasing their length. An output cavity 16 is disposed collaterally of the input cavity 14. The adjacent walls of the cavities 14 and 16 are made perforate or gridded, as shown at 18 and 20, in order to permit free flow of electrons from cathode 12 into the anode cavity 16. The grid 18 functions as a control grid for the tube, and the grids 18 and 20 serve to complete the conductive walls of the cavities 14 and 16. The inner side of the outer wall of the output cavity 16 is preferably provided with a relatively heavy anode post 22 extending longitidinally of the cavity. The cathode 12 is surrounded by an enclosure 24, the wall 26 of which is perforate or gridded. This enclosure 24 may be appropriately biased to isolate the cathode 12 from the resonant oscillations within the input cavity 14.

It will be seen in Fig. 8 that the tube is preferably made symmetrical, there being another output cavity 116 like the cavity 16 but on the opposite side of the input cavity 14. There is an additional cathode surface 112, an anode post 122 and grids 126, 118 and 120, corresponding respectively to the previously described parts numbered 12, 22, 26, 18 and 20.

Considering the construction in greater detail, and referring first to the output circuit, the properties of this circuit help determine the performance of the tube. Since the area of an axially symmetrical cavity is limited for the fundamental mode at a given frequency, I employ a linear cavity. Such a cavity may be made for a given wave length by taking a rectangular pipe, say one-half the size of the usual wave guide, and soldering inside to one of the broad sides a solid rectangular rod of any desired length. For example, if one takes the usual 3 cm. wave guide of 5/8" x 1¼" and secures a 3/8" x 3/8" piece inside, as shown at 16, 22 in Figs. 1 and 4, the resonant wave length will be about 10 cm. Except for end effects, such a cavity has the same resonant wave length and the same Q, irrespective of length. The shunt impedance, however, decreases as the length increases, such that the product is constant except, again, for end effects.

There appears to be no theoretical limit to how long the circuit can be made, so far as efficiency is concerned. If the length of the cavity exceeds something like 20 cm., more than one output coupling should be used. This is quite simple in the present design. Assuming a transverse dimension of the anode "post" of 1 cm., (instead of ⅜") and an anode R. F. swing of 104 volts, the copper losses are 50 watts per cm. of length, and the average input power, at 0.2 amp. $cm.^{-2}$, can be 2000 watts $cm.^{-1}$. This is for a continuous source of high power.

For pulsed power, the voltage must be increased. One may go to 50 kv. Both the grid and anode should preferably be pulsed simultaneously. By so doing, it is only necessary to apply a square pulse to the grid, the anode voltage being unimportant as far as output is concerned, so long as it is higher than a certain minimum. This places a much less stringent requirement on the high voltage pulser than is the case with a magnetron. Assuming a pulsed emission of 10 amp. $cm.^{-2}$ and an anode voltage of 50 kv., the R. F. copper losses are 1 kw. per cm. of anode length and a power input 500 kw. per cm. of length.

The grids must be capable of dissipating the power necessary for C. W. operation, because this is the more stringent requirement. For this purpose I use copper strip on edge. This is indicated at 20 in Fig. 4, but the strips run transversely, as shown in Fig. 3. Using strips 0.005" thick 0.100" high and 1 cm. long, the rise in temperature of the midpoint over the ends for a beam carrying 2 kw. per cm. of length, is about 500° C. To eliminate the effects of secondary electrons a grid is preferably provided on the anode also, with a Faraday cage behind (omitted in Figs. 1–8 for simplicity, but indicated at 138 in Figs. 9–10).

Coming now to the input circuit, its purpose is to produce a conduction modulated current that arrives at the output circuit without appreciable alteration in proper phase. For best efficiency the current should be ejected from the input cavity during only part of the R. F. cycle, preferably during less than one half the time, for class "C" operation. Another requirement is that the R. F. power to drive the input circuit shall be small compared with the power derived from the output cavity.

Referring to Figs. 5 and 6, the cathodes 12 and 112 are of oxide coated nickel. The square cathode element is enclosed within enclosure 24. The cathode is thus electrically outside the R. F. circuit, as indicated in Fig. 6. In operation, enclosure 24 is run at, say, +40 to +100 volts for C. W. and +500 to +1000 volts for pulsed operation. The cavity 14 and grids 18 and 118 are operated at some negative voltage. (All potentials are referred to the cathode.)

The potentials of the grids are shown graphically in Fig. 7, the line $G_1$ representing grids 26 and 126, and the line $G_2$ representing grids 18 and 118. Except for dynamic effects, some of which will be discussed later, there is a constant current flowing through grid $G_1$. If the potential of grid $G_2$ is the same as that of the cathode (see curve 1) and if the spacing between the cathode and grid $G_1$ is about equal to the spacing between grid $G_1$ and grid $G_2$, very little current will flow through grid $G_2$, and a potential minimum will be built up just in front. An R. F. voltage applied between grids $G_1$ and $G_2$ will alter the potential distribution. In curve 2 the grid $G_2$ has swung positive, and all the current will flow across, while in curve 3 the grid $G_2$ has swung negative, and no current will flow across. Such an arrangement of potentials allows current to flow through to the anode during approximately one-half of the R. F. cycle, but it is better to restrict this flow to say 90° out of the 360°, which may be done by biasing grid $G_2$ negatively with respect to the cathode by the proper amount.

It is difficult to calculate the electronic loading of the input circuit, because of the wide variety of transit angles involved. It is positive, that is, it takes more power to drive the input than if the beam were absent, but the loading is less than the pure diode loading one gets when the cathode is in the input circuit.

Placing the cathode electrically outside the input circuit has the advantage that a better R. F. circuit can be built; the loading due to the electron stream is less; and there is no problem of providing a good R. F. path to the cathode, while at the same time providing good heat insulation. It is possible to use a metal strip as a cathode, including one of the new coatings from which constant currents of as much as 3 amp. $cm.^{-2}$ can be drawn. However, it is also possible to put the cathode in the input circuit, by omitting the enclosure 24.

The spacings for a 10 cm. band tube may be, say, 20 mils from the cathode 12 to the first grid 26, and an equal distance between grid 26 and grid 18. Models show cold $Q_0$'s of about 800 and shunt impedances of 45,000 ohm cm., hence practically none of the input power is lost in the circuit itself.

When R. F. power of the proper wave length is fed into the circuit, the fundamental mode will set up an electric field which at one phase may be represented by Fig. 6. Thus electrons will be shot through one of the grids 18, 118 during one part of the R. F. cycle, and through the other grid one-half cycle later. This arrangement produces a kind of push-pull action that will first feed one anode circuit and then the other. The input and output circuits are schematically combined in Fig. 8, and a section across the center of the tube structure is shown in Fig. 9. If the loops in the two output circuits are reversed, the phases of the two R. F. voltages coming out will be the same. These can then be coupled together into a parallel combination. Wave guide feed instead of coaxial feed would be fairly easy to provide on the output cavity, but would be more difficult on the input cavity.

The grids in the input circuit may be made of one or two mil tungsten wire, gold soldered into molybdenum pieces. These are preferably kept taut by suitable means. It should be pointed out that the effects of grid emission or secondaries are here minimized. Either secondaries or primary emission from grid $G_1$ will be attracted directly back to that grid, since it is at a higher positive potential than either the cathode or the grid $G_2$. It is not likely that primary emission will occur from grid $G_2$, since its temperature will usually be quite low. It is also not likely that secondaries will cause much trouble for, in any event, grid $G_2$ can be tied back to the cathode through a low impedance path. Another advantage of using a long narrow cathode is that the grid wires, being transverse, can be made relatively short, thus permitting better cooling for a given current density.

In the input circuit the cathode width may be ¼", the $G_1$ to cathode spacing may be 0.020", the $G_1$ to $G_2$ spacing may be 0.020" also. For C. W. operation for an average current density of 0.2 amp. $cm.^{-2}$, $G_1$ would be operated at about +40 volts. The peak R. F. voltage across $G_1$, $G_2$ may be about 80 volts. The maximum amount of power needed to drive the input circuit would be no larger than say VI, where V is the R. M. S. value of the R. F. voltage, and I is the current. Thus per cm. of cathode area, the input power does not exceed say $60 \times 0.2 = 12$ watts, and may be considerably less than this. If this current is properly phased and the anode is run at 10 kv., 1 to 2 kw. power per $cm.^{-2}$ of cathode area may be derived from the output circuit.

For pulsed work the grid $G_1$ may be pulsed at about 500 volts for the above grid spacings and a current density of 10 amp. $cm.^{-2}$. With the contemplated grid current this requires a pulsed power of about 1 kw. $cm.^{-2}$ of area, assuming one-fifth of the current is intercepted by the grid. With these grid spacings and voltage there is considerable back bombardment of the cathode, which aids considerably in the emission.

Figure 10:
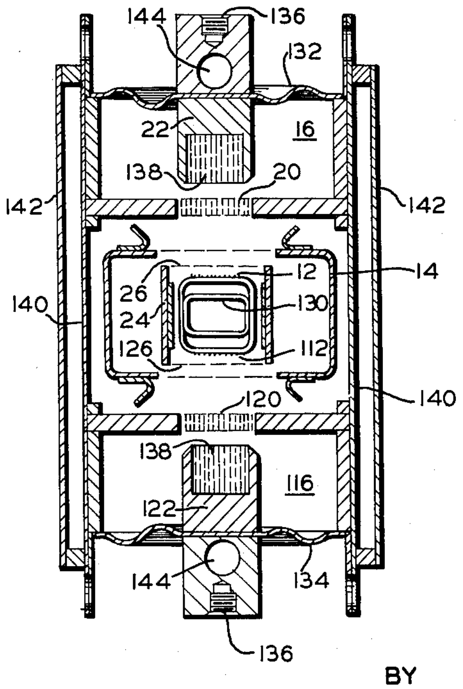
Fig. 10 is a generally similar section through the oscillator but taken at a point displaced from the couplings.

A section through a typical type structure embodying features of my invention is shown in Fig. 10. The cathode surfaces 12 and 112 are formed on opposite sides of a square pipe within which is provided a suitable heater, schematically represented at 130. The input cavity 14 and the biased enclosure 24 correspond to the similarly numbered parts in Fig. 8. The output cavities are shown at 16 and 116, the outer walls 132 and 134 being longitudinally corrugated and flexible in order to afford adjustment of the size of the cavity and thereby permit tuning of the output cavities to match one another and the input cavity 14. The tuning may be accomplished by means of a series of appropriately anchored adjusting screws (not shown) the inner ends of which are received in threaded holes 136.

The anode posts 22 and 122 are preferably provided with electron traps 138, these being made of a series of vanes disposed edgewise and longitudinally of the anode. The grids 20, 120 are preferably made of strip disposed edgewise in order to give them adequate current carrying capacity, as previously described. These strips run crosswise of the cavity, that is, parallel to the plane of the drawing, as is shown in Fig. 3.

The output cavities 16 and 116 are connected by additional walls 140 (Fig. 10), thereby providing an enclosure or envelope which may be evacuated. The outer walls are preferably jacketed as shown at 142 for liquid cooling, and the flexible walls 132 and 134 may be additionally jacketed for liquid cooling, as is indicated at 144.

The mechanical details of tuning, providing adequate heat conduction paths, electrical insulation, etc. while important, offer no special difficulties. The tube is built up for the most part out of copper plated sheet steel, welded together, with the main body copper soldered together.

Fig. 9 shows a section similar to Fig. 10 but taken through the input and output lines and couplings. The lines shown are coaxial lines with coupling loops. The input line is made up of conductors 150 and 152, with dielectric vacuum seals as shown at 154 and 156. The loop 158 couples the input line to the input cavity 14. The output cavity 16 is provided with a coupling loop 160 connected to a coaxial line made up of an inner conductor 162 and an outer conductor 164, there being an appropriate dielectric vacuum seal 166. The output cavity 116 is similarly provided with a coupling loop 170 connected to a coaxial line made up of an inner conductor 172 and an outer conductor 174 sealed by an appropriate vacuum seal 176. The output loops 160 and 170 are preferably oppositely phased, so that the push-pull outputs of the two output circuits may be combined in phase. The region of the cavity 16 beyond the ends of the anode "post" 22 acts as a wave guide beyond cutoff and therefore its length is a matter of convenience (see Fig. 2).

It is believed that the construction and operation of the improved microwave oscillator, as well as the advantages thereof, will be apparent from the foregoing detailed description. The tube is a power tube which may be operated in the 10 centimeter band to produce either continuous waves or pulses. Inasmuch as the tube is of the space-charge-control type, it may be used either as an amplifier or as a self-excited oscillator. It may be amplitude modulated with very little accompanying undesired frequency modulation. The tube employs linear cavities which permit any desired area of cathode and anode. A variety of types of cathode may be used, including even pure tungsten if desired. The oscillator is tunable over a reasonable range of, say, 5 to 10%. Very little machine work is needed. Functioning as an oscillator, the overall efficiency should be somewhere between 50 and 80%. The power input under continuous wave operation may be from 10 to 20 kilowatts, and under pulsed operation may be as much as 5 megawatts.

On pulsed operation there are much less stringent requirements on the constancy of the voltage of the pulse applied to the anode than is the case with a magnetron. A square pulse is applied to the grid, but this is a low voltage pulse. There is no possibility of mode jumping, as with the magnetron. Under continuous wave operation the power output may be of the order of 25 kilowatts, and on pulsed operation the power output may be of the order of a megawatt.

The push-pull type of circuit shown has the advantage that the cathode structure is exceedingly simple and presents no problems of bypassing radio frequency, nor or conduction of heat. Because of the linear type of cavities employed, there is no theoretical limit to the area of cathode surface which may be used, although there are of course practical limits.

It will be understood that while I have shown and described my invention in a preferred form, changes may be made in the structure disclosed without departing from the spirit of the invention, as sought to be defined in the following claims.

What is claimed is:

1. A microwave oscillator comprising, a linear input cavity resonator having a foraminous wall, a linear output cavity resonator having a foraminous wall and disposed collaterally of said linear input resonator, said foraminous walls being adjacent one another, a cathode having a surface disposed inside of, and extending longitudinally of, said input resonator and an enclosure around said cathode, said enclosure having a foraminous wall facing said adjacent foraminous walls of said resonators, said enclosure being adapted to be biased positively with respect to said cathode, said output resonator having a portion thereof adapted to act as an anode, said foraminous wall of said input resonator being adapted to act as a grid.

2. A microwave oscillator comprising, a linear input cavity resonator having at least one perforate wall, a linear output cavity resonator having at least one perforate wall and disposed collaterally of said input resonator, a perforate wall of said input resonator being adjacent and facing a perforate wall of said output resonator, a cathode having a surface disposed inside of, and extending longitudinally of, said input resonator, and an enclosure disposed around said cathode and having a perforate wall facing said adjacent perforate walls of said resonators, said enclosure being adapted to be biased positively with respect to said cathode, said perforate wall of said input resonator being adapted to act as a control grid and to be biased with respect to said cathode for class C operation, said output resonator having a portion thereof adapted to act as an anode, additional walls completing an evacuated envelope for said recited elements, an input line coupled to said input resonator, and an output line coupled to said output resonator.

3. A microwave oscillator comprising, a linear input cavity resonator having opposite foraminous walls, first and second linear output cavity resonators disposed collaterally on opposite sides of said input resonator and each having a foraminous wall adjacent a foraminous wall of said input resonator, and a cathode having a surface disposed inside of, and extending longitudinally of, said input resonator, the foraminous walls of said input resonator being adapted to act as push-pull control grids for said oscillator, said output resonators having portions thereof adapted to act as anodes.

4. A microwave oscillator comprising, a linear input cavity resonator having opposite slotted walls, first and second linear output cavity resonators disposed collaterally on opposite sides of said input resonator and each having a slotted wall adjacent a slotted wall of said input resonator, a cathode having a surface disposed inside of, and extending longitudinally of, said input resonator, the slotted walls of said input resonator being adapted to act as push-pull control grids for said oscillator, said output resonators having portions thereof adapted to act as anodes, and an enclosure disposed around said cathode and having opposite slotted walls adjacent and facing said slotted walls of said input resonator, said enclosure being adapted to be biased positively with respect to said cathode.

5. A microwave oscillator comprising, a linear input cavity resonator having opposite gridded walls, first and second linear output cavity resonators disposed collaterally on opposite sides of said input resonator and each having a gridded wall adjacent a gridded wall of said input resonator, a cathode having a surface disposed inside of, and extending longitudinally of, said input resonator, the gridded opposite walls of said input resonator being adapted to act as push-pull control grids for said oscillator, said output resonators having portions thereof adapted to act as anodes, and an enclosure disposed around said cathode and having opposite gridded walls adjacent to and facing said gridded opposite walls of said input resonator, said enclosure being adapted to be biased positively with respect to said cathode.

6. A microwave oscillator comprising, a linear input cavity resonator having opposite slotted side walls, first and second linear output cavity resonators disposed collaterally on opposite sides of said input resonator, said linear output resonators each having a slotted wall adjacent and facing a slotted wall of said input resonator, a cathode having a surface disposed inside of, and extending longitudinally of, said input resonator, said output resonators having portions thereof adapted to act as anodes for said oscillator, said opposite slotted walls of said input resonator being adapted to act as push-pull control grids for said oscillator, an enclosure disposed around said cathode and having opposite slotted walls adjacent and facing said opposite slotted walls of said input resonator, said enclosure being adapted to be positively biased with respect to said cathode, additional envelope walls extending between said output resonators to complete an evacuated envelope for the recited elements adapted to act as tube elements, an input line coupled to said input resonator, and an output line for each of said output resonators, each of said output lines being coupled to a separate output resonator, said output lines being so phased that push-pull outputs from said output resonators may be combined in phase.

7. A microwave oscillator comprising, a linear input cavity resonator having at least one perforate side wall, a linear output cavity resonator disposed collaterally of said input resonator and having a perforate side wall adjacent the perforate wall of said input resonator, said output resonator further having a second wall opposite said perforate walls, a conductive bar in said output resonator secured to said second wall and extending longitudinally of said output resonator and a cathode having a surface disposed inside of, and extending longitudinally of, said input resonator, said bar being adapted to act as an anode, and said perforate wall of said input resonator being adapted to act as a control grid.

8. Apparatus as in claim 7 wherein said bar is of uniform rectangular cross section and is secured at one of its longitudinal sides to said second wall of said output resonator.

9. Apparatus as in claim 7 wherein said bar is of uniform cross section and formed with a cavity extending longitudinally of said output resonator, said cavity presenting an opening opposite the perforate wall of said output resonator, and a series of conductive vanes conductively secured to said bar in said cavity of said bar and disposed longitudinally of said output resonator in parallel planes transverse to said perforate walls.

10. Apparatus as in claim 7 wherein said bar is of uniform rectangular cross section and is secured at one of its longitudinal sides to the second wall of said output resonator and wherein said perforate walls of said input and output resonators are composed of strip metal for high current carrying capacity, said strip metal being disposed transversely of the longitudinal direction of said resonators and in parallel planes transverse to said perforate walls.

11. Apparatus as in claim 7 wherein said second wall of said output resonator is corrupated and flexible for controlling the resonant frequency of said output resonator.

12. A microwave oscillator comprising, a linear input cavity resonator of uniform rectangular cross section throughout its longitudinal length and formed with two opposite foraminous side walls extending along said longitudinal length, two linear output cavity resonators each being of uniform rectangular cross section throughout its longitudinal length and having one foraminous side wall and a second wall opposite said foraminous side wall, said output resonators being disposed collaterally on said opposite sides of said input resonator so that each foraminous wall of said input resonator is adjacent and facing a foraminous wall of an output resonator, a cathode having a surface disposed inside of, and extending longitudinally of, said input resonator, said output resonators having portions thereof adapted to act as anodes for said oscillator, said opposite foraminous walls of said input resonator being adapted to act as push-pull control grids for said oscillator, and an enclosure around said cathode extending longitudinally of said cathode and said input resonator, said enclosure having foraminous opposite walls facing said opposite foraminous walls of said input resonator.

13. Apparatus as in claim 12, wherein said enclosure is adapted to be positively biased with respect to said cathode.

14. Apparatus as in claim 12, wherein said portions comprise an anode post disposed inside of, and secured to, the second wall of each of said output resonators, said anode posts extending longitudinally of the output resonators.

15. Apparatus as in claim 12, wherein the second wall of each output resonator is corrugated and flexible for controlling the resonant frequency of each output resonator to match the resonant frequency of said input resonator.

16. Apparatus as in claim 12, wherein each foraminous wall of said input and output resonators is made of metal strips for high current carrying capacity, said metal strips being disposed transversely of the longitudinal direction of said resonators, and in parallel planes transverse to said foraminous walls defined by said strips.

17. A microwave oscillator including, first and second collaterally disposed linear cavity resonators, each having a substantially uniform rectangular cross-section throughout its longitudinal length, each of said resonators having at least one gridded wall extending longitudinally of the resonators, a gridded wall of one resonator being adjacent and facing a gridded wall of the other resonator, and a cathode having a surface disposed inside of, and extending longitudinally of, said first resonator, said second resonator having a portion thereof adapted to act as an anode, said gridded wall of said first resonator being adapted to act as a control grid so that in the operation of said oscillator the directions of electron current flow from said cathode are substantially parallel to planes including the electric field lines within said resonators.

18. A microwave oscillator comprising, a linear input cavity resonator having a uniform rectangular cross section throughout its longitudinal length and having two pairs of opposite walls extending throughout its longitudinal length, first and second linear output cavity resonators disposed collaterally on opposite sides of said input resonator, each of said output resonators being of uniform rectangular cross section throughout its longitudinal length and having two pairs of opposite walls extending throughout its longitudinal length, said input and output resonators being of substantially the same longitudinal length, said input resonator having its wider opposite walls foraminous throughout their longitudinal lengths, each of said output resonators having one of its wider opposite walls foraminous throughout its longitudinal length, the foraminous wall of each output resonator being parallel to, and facing, a separate foraminous wall of said input resonator, a cathode having a surface of uniform rectangular cross section disposed inside of, and extending longitudinally of, said input resonator, an enclosure of uniform rectangular cross section surrounding said cathode, said enclosure being disposed inside of, and extending longitudinally of, said input resonator, said enclosure having a pair of opposite foraminous walls, each foraminous wall of said enclosure being parallel to, and facing, a separate formaminous wall of said input resonator, a conductive member disposed inside of each of said output resonators and secured to the wall thereof opposite the foraminous wall, said conductive members extending longitudinally of said output resonators, the wider walls of said output resonators opposite the foraminous wider walls of said output resonators being corrugated and flexible in order that the resonant frequencies of said output resonators may be controlled to match the resonant frequency of said input resonator, the conductive members of said output resonators being adapted to act as anodes, said foraminous walls of said input resonator being adapted to act as push-pull control grids, said input resonator being adapted to be biased with respect to said cathode, said enclosure being adapted to be biased positively with respect to said cathode, an input line coupled to said input resonator and first and second output lines coupled respectively to said first and second output resonators, said output lines being so phased that the push-pull outputs of said output resonators may be combined in phase.

19. Apparatus as in claim 18 wherein each of said conductive members secured to, and disposed inside of, said output resonators comprises, a bar of uniform cross section and formed with a cavity extending longitudinally of an output resonator, said cavity presenting an opening opposite a foraminous wall of an output resonator and a series of conductive vanes conductively secured to said bar and disposed in said cavity of said bar, said vanes being disposed longitudinally of an output resonator in parallel planes transverse to the foraminous walls of said output resonators, and wherein said foraminous walls of said input and output resonators comprise conductive vanes disposed transversely of the longitudinal direction of said resonators and in parallel planes transverse to said foraminous walls.

References Cited in the file of this patent

UNITED STATES PATENTS

| | | |
|---|---|---|
| 2,170,219 | Seiler | Aug. 22, 1939 |
| 2,281,935 | Hansen et al. | May 5, 1942 |
| 2,298,949 | Litton | Oct. 13, 1942 |
| 2,320,860 | Fremlin | June 1, 1943 |
| 2,383,343 | Ryan | Aug. 21, 1945 |
| 2,407,298 | Skellet | Sept. 10, 1946 |
| 2,409,222 | Morton | Oct. 15, 1946 |
| 2,472,204 | Fubini et al. | June 7, 1949 |